UNITED STATES PATENT OFFICE.

JOHN H. FILBERT, OF BALTIMORE, MARYLAND.

ANIMAL-FAT PRODUCT AND PROCESS OF MAKING THE SAME.

No. 929,926.   Specification of Letters Patent.   Patented Aug. 3, 1909.

Application filed July 3, 1908. Serial No. 441,862.

*To all whom it may concern:*

Be it known that I, JOHN H. FILBERT, a citizen of the United States, residing at Baltimore, in the State of Maryland, have invented certain new and useful Improvements in Animal-Fat Products and Processes of Making the Same, of which the following is a specification.

This invention relates to an improvement in animal fats which are nearly odorless, and from which the more oily part has been separated, such as the well known articles of commercial stearin, an article termed "oleo stock," and also edible tallow; these are known as dry fats. The improvement consists in imparting to the said animal fats the odor, flavor or essence of animal crackling or other form of animal tissue.

The manufacturers of animal products make so-called "lard compounds" or substitutes for lard, that contain a large percentage of cotton-seed oil and certain ingredients for giving body or for stiffening that vary in their composition; the stiffening ingredients are always animal fats and are generally the products of beef fats in one form or another. One manufacturer, for instance, will use oleo stearin, another will use oleo stock, and still another will use edible tallow, but in making these compounds which are substitutes for lard all of the manufacturers use cotton-seed oil.

While the cotton-seed oil is wholesome as an alimentary article, it has the objection that develops a disagreeable odor when heated; and as the prepared products of animal fats herein referred to have but little odor or flavor, they do not materially modify the unpleasant odor due to the oil that arises when the food compounds of which they are part, are heated. This odor is always developed when these food compounds are heated in the necessary domestic operations of cooking. This unpleasant odor is not attributable to the prepared beef fats, because they are almost neutral and are comparatively free of odor, but is due to the cotton-seed oil which is the predominating ingredient in the said food compounds.
One of the inventive ideas that I wish to disclose is that the nearly neutral products of beef fats referred to, may be imbued with an odor or flavor more or less intense, and that when so flavored these fats or any one of them will not only serve to give body or to stiffen the cotton-seed oil food compounds, but will also serve the new purpose of modifying the unpleasant odor of the cotton-seed oil and converting it into an odor that is unobjectionable.

I have found fresh animal crackling contains a valuable essence or flavor that may be used to overcome the objectionable odor of cotton-seed oil.

In rendering animal fats, either of the hog or the beef, by the open-kettle process, heat is employed to about 280 degrees F. During the rendering operation the small particles of all tissue, which by nature are distributed through the fat, is affected by becoming slightly brown and rising to the surface from which it is removed. This cooked animal tissue is collected and while hot is put in a press and the oil is expressed from it; the residium left in the press is in the form of a dense cake or mass of animal tissue, and is known as "crackling."

The object of the present invention is to imbue the prepared products of animal fats such as oleo stearin, oleo stock and edible tallow which are nearly neutral as to odor, with the essence, odor or flavor of fresh animal crackling, in order that when said products are used as stiffening ingredients in cotton-seed oil food compounds, their strong flavor will overcome, suppress or at least modify the objectionable odor occasioned by the cotton-seed oil.

The present invention therefore consists in an article of manufacture comprising the prepared products of animal fats which are almost neutral but have been imbued with the odor or flavor of animal tissue, such as hog crackling or beef crackling.

The invention also consists of a process for imbuing the prepared products of animal fats which are nearly neutral as to odor, with the essence, odor or flavor of animal tissue of crackling—either hog or beef.

In carrying out my invention I take any of the prepared beef fats, or derivatives of beef fats, such as stearin, and apply heat in order to reduce it to a liquid condition like that of oil, and then add an equal quantity, or nearly an equal quantity of animal crackling and bring the mass to a temperature of say 350 degrees Fahrenheit. By this step the prepared beef fats or the derivatives of beef fats, will become imbued with the essence, odor or flavor of the crackling, and when the blend has been effected and while the mass is in a liquid condition, the crackling is to be separated from the mass by filtration or otherwise. After the separation of the crackling from the prepared beef fats, or the derivatives of beef fats the latter will congeal and assume their normal semi-solid condition, and will have the odor or flavor of the crackling. These flavored products of beef fat or their derivatives, are especially adapted for imparting the property of body and stiffening to food compounds in which cotton-seed oil is an ingredient; such compounds will have the pleasant odor or flavor of the crackling and the objectionable odor of the cotton-seed oil will not predominate.

It will be understood that the essential idea of this invention is to imbue any of the beef fats, or products of beef fats, with the essence, flavor or odor of animal crackling, and that the steps herein described of reducing the beef fats to a liquid condition, adding animal crackling, and then separating the crackling from the beef fats is one of perhaps several ways in which this imbuing may be accomplished.

Having thus described my invention what I claim and desire to secure by Letters Patent is,—

1. An article of manufacture consisting of animal dry fat which has absorbed hog crackling essence.

2. An improved article consisting of stearin which normally is nearly neutral as to odor, and which is flavored with the essence of animal crackling, as set forth.

3. An article of manufacture consisting of beef fat having the flavor of hog crackling.

4. The herein-described process consisting of heating a product of animal fat which normally is nearly neutral as to odor and reducing such fat to a liquid condition; adding thereto animal crackling to imbue the said liquid fat with the essence, odor or flavor of the said animal crackling; and then separating the said crackling from the said product of beef fat.

In testimony whereof I affix my signature in presence of two witnesses.

JOHN H. FILBERT.

Witnesses:
CHARLES B. MANN, Jr.,
G. FERDINAND VOGT.